(12) United States Patent
Tsuda et al.

(10) Patent No.: US 7,482,101 B2
(45) Date of Patent: Jan. 27, 2009

(54) BATTERY

(75) Inventors: Karin Tsuda, Fukushima (JP); Gentaro Kano, Fukushima (JP)

(73) Assignee: Sony Corporation, Tokyo (JP)

( * ) Notice: Subject to any disclaimer, the term of this patent is extended or adjusted under 35 U.S.C. 154(b) by 600 days.

(21) Appl. No.: 11/147,767

(22) Filed: Jun. 7, 2005

(65) Prior Publication Data

US 2005/0282071 A1 Dec. 22, 2005

(30) Foreign Application Priority Data

Jun. 21, 2004 (JP) ............................ P2004-182762

(51) Int. Cl.
*H01M 6/16* (2006.01)
(52) U.S. Cl. .................... 429/331; 429/330; 429/323; 429/199; 429/231.8; 429/231.4; 429/231.3; 429/231.1
(58) Field of Classification Search .............. 429/231.1, 429/231.8, 231.4, 330, 331, 199, 231.3, 323
See application file for complete search history.

(56) References Cited

U.S. PATENT DOCUMENTS

| 6,506,524 B1 | 1/2003 | McMillan et al. |
| 2001/0053485 A1 | 12/2001 | Shibuya et al. |
| 2004/0229128 A1* | 11/2004 | Noh .......................... 429/330 |

FOREIGN PATENT DOCUMENTS

| EP | 0 627 777 | * 12/1994 |
| JP | 2001501355 | 1/2001 |
| JP | 2001313075 A | 11/2001 |
| WO | WO 98/15024 | * 4/1998 |

* cited by examiner

*Primary Examiner*—Laura S Weiner
(74) *Attorney, Agent, or Firm*—Bell, Boyd & Lloyd LLP

(57) ABSTRACT

A battery is provided. The battery provides improved battery characteristics such as cycle characteristics. A battery includes a cathode; an anode; and an electrolytic solution, wherein the anode contains a carbon material, the electrolytic solution contains propylene carbonate and 4-fluoroethylene carbonate, and the content of 4-fluoroethylene carbonate is from about 0.0027 g to about 0.056 g per about 1 g of the carbon material.

5 Claims, 2 Drawing Sheets

BATTERY

CROSS REFERENCES TO RELATED APPLICATIONS

This application claims priority to Japanese Patent Document No. 2004-182762, filed on Jun. 21, 2004 with the Japanese Patent Office, which disclosure in its entirety is hereby incorporated by reference.

BACKGROUND

The present invention relates to a battery, in which an anode contains a carbon material and an electrolytic solution contains propylene carbonate.

As electronic apparatuses have become downsized, development of a battery having a high energy density has been demanded. As a battery to meet such needs, there is a lithium metal secondary battery utilizing precipitation and dissolution of lithium (Li) in the anode. However, in the lithium metal secondary battery, when charged, lithium is dendrite-precipitated on the anode and inactivated, and therefore there is a disadvantage that the cycle life is short.

As the battery, in which such cycle life is improved, there is a lithium ion secondary battery. The lithium ion secondary battery utilizes insertion and extraction of lithium in the anode. For example, a lithium ion secondary battery, in which a carbon material such as graphite is used for the anode, and carbonic acid ester such as propylene carbonate is used for the electrolytic solution is in practical use. However, propylene carbonate is easily decomposed in the anode. Therefore, inhibiting such reaction by adding various additives to the electrolytic solution is considered. For example, adding 4-fluoroethylene carbonate has been suggested (for example, refer to Japanese Unexamined Patent Application Publication No. 2001-313075).

When 4-fluoroethylene carbonate is added, decomposition of propylene carbonate is inhibited. However, in this case, the interface resistance of the anode is increased. Therefore, there is a disadvantage that when the area density of the anode is increased, the load characteristics become lowered, and the capacity becomes widely deteriorated.

In view of the foregoing disadvantages, in the present invention, it is desirable to provide a battery coverable of improving battery characteristics such as cycle characteristics.

SUMMARY

According to an embodiment of the present invention, there is provided a battery including a cathode, an anode, and an electrolytic solution. The anode contains a carbon material. The electrolytic solution contains propylene carbonate and 4-fluoroethylene carbonate. The content of 4-fluoroethylene carbonate is from 0.0027 g to 0.056 g per about 1 g of the carbon material.

According to the battery of an embodiment of the present invention, 4-fluoroethylene carbonate is contained at a ratio from 0.0027 g to 0.056 g per about 1 g of the carbon material of the anode. Therefore, decomposition reaction of propylene carbonate can be effectively inhibited while increase in the interface resistance of the anode is held down. Consequently, the battery characteristics such as cycle characteristics can be improved.

Additional features and advantages of the present invention are described in, and will be apparent from, the following Detailed Description and the figures.

DETAILED DESCRIPTION

An embodiment of the present invention will be hereinafter described in detail with reference to the drawings.

Figure 1:
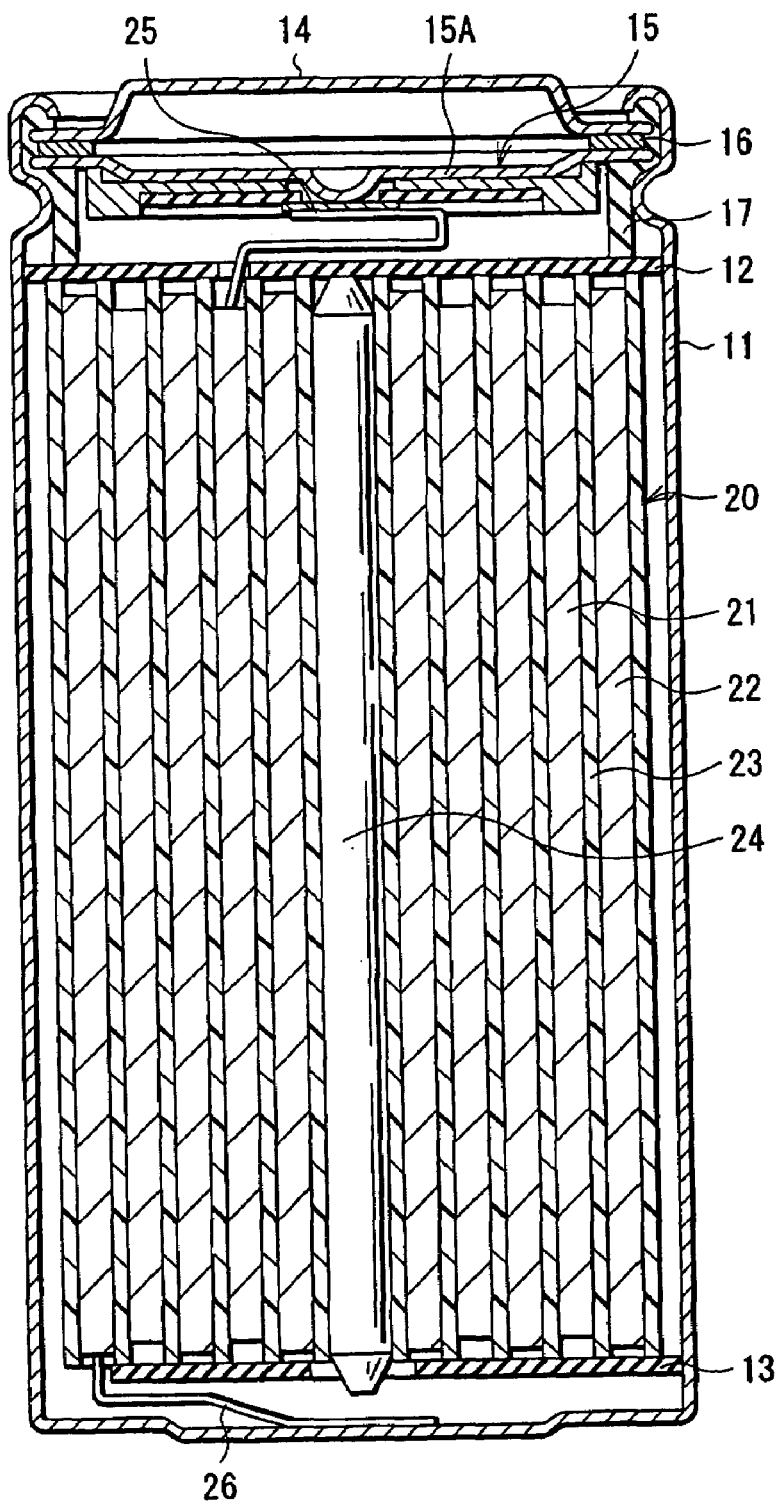
FIG. 1 is a cross section showing a construction of a secondary battery according to an embodiment of the present invention.

FIG. 1 shows a cross section structure of a secondary battery according to the embodiment of the invention. The secondary battery is a so-called cylindrical battery, and has a winding electrode body 20, in which a strip-shaped cathode 21 and a strip-shaped anode 22 are wound with a separator 23 inbetween inside a battery can 11 in the shape of an approximately hollow cylinder. The battery can 11 is made of, for example, iron (Fe) plated by nickel (Ni) and the like. One end of the battery can 11 is closed, and the other end of the battery can 11 is opened. Inside the battery can 11, a pair of insulating plates 12 and 13 is respectively arranged perpendicular to the winding periphery face, so that the winding electrode body 20 is sandwiched between the insulating plates 12 and 13.

At the open end of the battery can 11, a battery cover 14, and a safety valve mechanism 15 and a PTC (Positive Temperature Coefficient) device 16 provided inside the battery cover 14 are attached by being caulked through a gasket 17. Inside of the battery can 11 is sealed. The battery cover 14 is, for example, made of a material similar to that of the battery can 11. The safety valve mechanism 15 is electrically connected to the battery cover 14 through the PTC device 16. When the internal pressure of the battery becomes a certain level or more by internal short circuit, external heating or the like, a disk plate 15A flips to cut the electrical connection between the battery cover 14 and the winding electrode body 20. When temperatures rise, the PTC device 16 limits a current by increasing the resistance value to prevent abnormal heat generation by a large current. The gasket 17 is made of, for example, an insulating material and its surface is coated with asphalt.

A center pin 24 is inserted in the center of the winding electrode body 20. A cathode lead 25 made of aluminum (Al) or the like is connected to the cathode 21 of the winding electrode body 20. An anode lead 26 made of nickel or the like is connected to the anode 22. The cathode lead 25 is electrically connected to the battery cover 14 by being welded to the safety valve mechanism 15. The anode lead 26 is welded and electrically connected to the battery can 11.

Figure 2:
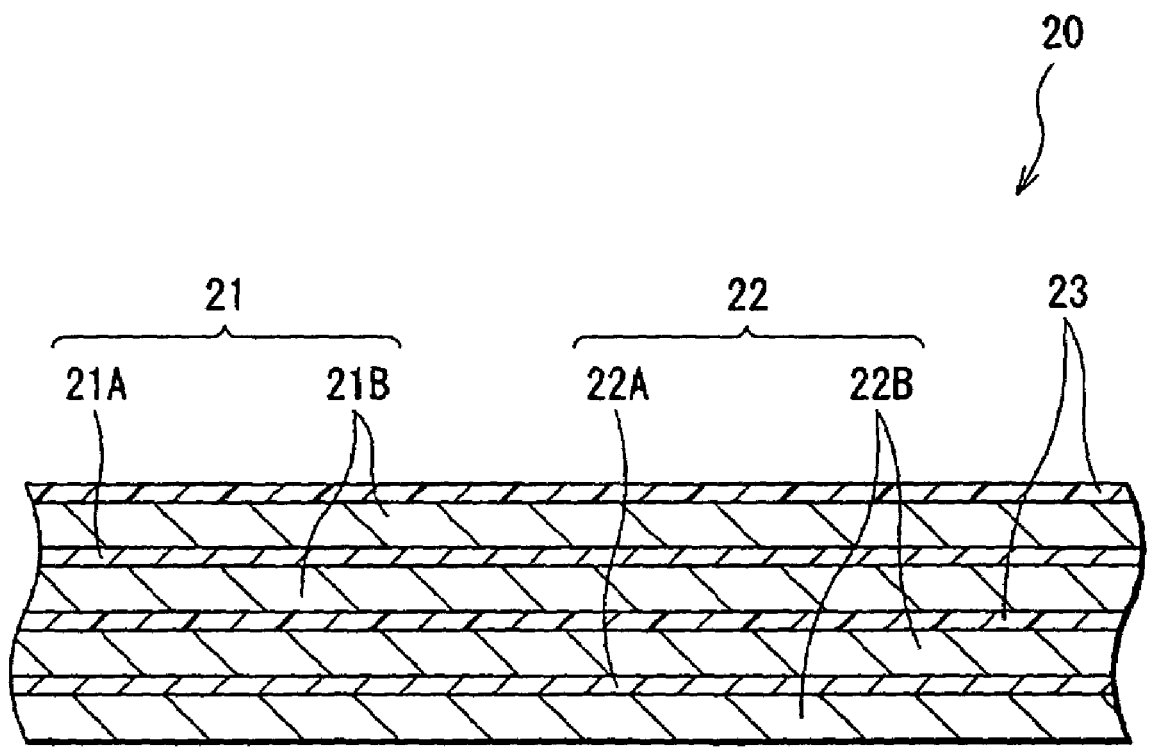
FIG. 2 is a cross section showing an enlarged part of a winding electrode body in the secondary battery shown in FIG. 1.

FIG. 2 shows an enlarged part of the winding electrode body 20 shown in FIG. 1. The cathode 21 has a structure, in which, for example, a cathode active material layer 21B is provided on both faces of a cathode current collector 21A having a pair of opposed faces. Though not shown, it is possible that the cathode active material layer 21B is provided only on one face of the cathode current collector 21A. The cathode current collector 21A is made of, for example, a metal foil such as an aluminum foil, a nickel foil, and a stainless foil.

The cathode active material layer 21B contains, for example, one or more cathode materials capable of inserting and extracting lithium as a cathode active material. In addition, the cathode active material layer 21B can also contain a conductive agent and a binder as necessary. As a cathode material capable of inserting and extracting lithium, for example, a metal sulfide, a metal selenide, or a metal oxide containing no lithium, such as titanium sulfide ($TiS_2$), molybdenum sulfide ($MoS_2$), niobium selenide ($MbSe_2$), and vanadium oxide ($V_2O_5$); or a lithium-containing compound containing lithium can be cited.

Specially, the lithium-containing compound is preferable, since some of the lithium-containing compound can provide a high voltage and a high energy density. As such lithium-containing compound, for example, a compound expressed by Chemical formula $Li_xMIO_2$ or $Li_yMIIPO_4$ can be utilized. In the chemical formulas, MI and MII represent one or more transition metals. In particular, at least one of cobalt (Co), nickel, and manganese (Mn) is preferably included, since a higher voltage can be obtained. In the formulas, values of x and y vary according to charge and discharge states of the battery. In general, the values of x and y are in the range of $0.05 \leq x \leq 1.10$ and $0.05 \leq y \leq 1.10$. As a specific example of the lithium-containing compound expressed by the chemical formula $Li_xMIO_2$, a lithium cobalt complex oxide ($LiCoO_2$), a lithium nickel complex oxide ($LiNiO_2$), a lithium nickel cobalt complex oxide ($Li_zNi_vCo_{1-v}O_2$. In the formula, z and v vary according to charge and discharge states of the battery. In general, z and v are in the range of $0<z<1$ and $0.7<v<1.02$.)), a lithium manganese complex oxide ($LiMn_2O_4$) having a spinel-type structure or the like can be cited.

The anode 22 has a structure, in which, for example, an anode active material layer 22B is provided on both faces of an anode current collector 22A having a pair of opposed faces. Though not shown, it is possible that the anode active material layer 22B is provided only on one face of the anode current collector 22A. The anode current collector 22A is made of, for example, a metal foil such as a copper foil, a nickel foil, and a stainless foil.

The anode active material layer 22B contains, for example, one or more carbon materials as an anode active material. Further, the anode active material layer 22B can also contain a binder such as polyvinylidene fluoride as necessary. The carbon material is preferable, since, for example, the carbon material can insert and extract lithium. In addition, the carbon material shows very small change in the crystal structure according to charge and discharge, and provides good cycle characteristics. As such a carbon material, graphite, non-graphitizable carbon, graphitizable carbon or the like can be cited. In particular, graphite is preferable, since the electrochemical equivalent is large, and the high energy density can be obtained.

As graphite, for example, graphite, in which the true density is 2.10 g/cm³ or more, and the face distance of face (002) is less than 0.340 nm is preferable. Graphite, in which the true density is 2.18 g/cm³ or more, and the face distance of face (002) is in the range from 0.335 nm to 0.337 nm is more preferable. As non-graphitizable carbon, for example, non-graphitizable carbon, in which the face distance of face (002) is 0.37 nm or more, the true density is less than 1.70 g/cm³, and the exothermic peak is not shown at 700° C. or more in DTA (differential thermal analysis) in the air is preferable.

Specific examples of the carbon material include pyrolytic carbons, cokes, graphites, glassy carbons, organic high molecular weight compound fired body, carbon fibers, activated carbon, carbon blacks and the like. Of the foregoing, cokes include pitch cokes, needle cokes, petroleum cokes and the like. Organic high molecular weight compound fired body is a carbonized body obtained by firing a high molecular weight material such as a phenol resin and a furan resin at appropriate temperatures.

The area density of the anode is preferably 18.0 mg/cm² or less. It is preferable that the area density is increased, since the amount of the anode active material in the battery can be increased and the capacity can be increased. However, when the area density is too increased, the thickness of the anode active material layer 22B becomes too thick, and as described later, even if the composition of the electrolytic solution is adjusted, decomposition reaction of the electrolytic solution cannot be fully inhibited. In addition, the interface resistance of the anode 22 becomes increased, and the cycle characteristics become lowered.

The separator 23 separates the cathode 21 from the anode 22, prevents current short circuit due to contact of both electrodes, and lets through lithium ions. The separator 23 is made of, for example, a synthetic resin porous film made of polytetrafluoroethylene, polypropylene, polyethylene or the like, or a porous film made of an inorganic material such as a ceramics nonwoven cloth. The separator 23 can have a structure, in which two or more of the foregoing porous films are layered.

The separator 23 is impregnated with an electrolytic solution, which is the liquid electrolyte. The electrolytic solution contains an electrolyte salt and a solvent, which dissolves the electrolyte salt.

As an electrolyte salt, lithium salts such as $LiPF_6$, $LiAsF_6$, $LiBF_4$, $LiClO_4$, $LiB(C_6H_5)_4$, $LiCH_3SO_3$, $LiCF_3SO_3$, $LiN(CF_3SO_2)_2$, $LiN(C_2F_5SO_2)_2$, $LiN(C_4F_9SO_2)(CF_3SO_2)$, $LiC(CF_3SO_2)_3$, $LiC_4F_9SO_3$, $LiAlCl_4$, $LiSiF_6$, $LiCl$, and $LiBr$ can be utilized. One electrolyte salt can be used singly, or two or more of the electrolyte salts can be used by mixing. Specially, $LiPF_6$ is preferable since high conductivity can be thereby obtained.

The content (concentration) of the electrolyte salt in the electrolytic solution is preferably in the range from 0.1 mol/l to 2.0 mol/l, or in the range from 0.1 mol/kg to 2.0 mol/kg. In such a range, good ion conductivity can be obtained.

The solvent contains at least propylene carbonate expressed in Chemical formula 1 as detailed below. Since propylene carbonate has high dielectric constant, high ion conductivity can be obtained. As other solvent having high dielectric constant, there is ethylene carbonate expressed in Chemical formula 2 as detailed below. However, ethylene carbonate has poor low temperature characteristics. Therefore, it is preferable to use ethylene carbonate by being mixed with propylene carbonate.

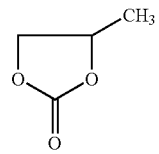

Chemical formula 1

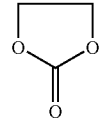

Chemical formula 2

The solvent further contains 4-fluoroethylene carbonate expressed in Chemical formula 3 as detailed below. When 4-fluoroethylene carbonate expressed in Chemical formula 3 is contained, a stable coating is formed on the anode 22, and decomposition reaction of propylene carbonate in the anode 22 can be inhibited. The content of 4-fluoroethylene carbonate in the electrolytic solution is preferably from 0.0027 g to 0.056 g per about 1 g of the carbon material contained in the anode 22. In this range, decomposition reaction of propylene carbonate can be effectively inhibited while increase in the interface resistance of the anode 22 is inhibited.

Chemical formula 3

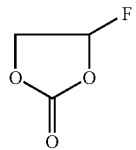

The solvent can include propylene carbonate and 4-fluoroethylene carbonate. Otherwise, such solvent can be mixed with other one or more solvents. As other solvent, in addition to the foregoing ethylene carbonate, vinylene carbonate, diethyl carbonate, dimethyl carbonate, 1,2-dimethoxy ethane, 1,2-diethoxy ethane, γ-butyrolactone, γ-valerolactone, tetrahydrofuran, 2-methl tetrahydrofuran, 1,3-dioxolane, 4-methyl-1,3-dioxolane, diethyl ether, sulfolane (tetrahydrothiophene 1,1-dioxide), methyl sulfolane, acetonitrile, propionitrile, anisole, acetic ester, ester butyrate, propionic ester, fluoro benzene and the like can be utilized.

Instead of the electrolytic solution, a gelatinous electrolyte can be used. The gelatinous electrolyte is an electrolyte, for example, in which an electrolytic solution is held in a high molecular weight compound. The electrolytic solution (that is, the solvent, the electrolyte salt and the like) is as described above. Any high molecular weight compound can be used as long as the high molecular weight compound absorbs and gelates the electrolytic solution. As such high molecular weight compound, for example, a fluorinated high molecular weight compound such as polyvinylidene fluoride and a copolymer of vinylidene fluoride and hexafluoro propylene; an ether high molecular weight compound such as polyethylene oxide and a cross-linked compound containing polyethylene oxide; or polyacrylonitrile can be cited. In particular, in view of redox stability, the fluorinated high molecular weight compound is desirable.

In this secondary battery, when charged, for example, lithium ions are extracted from the cathode active material layer 21B, and are inserted in the anode active material layer 22B through the electrolytic solution. When discharged, for example, lithium ions are extracted from the anode active material layer 22B, and are inserted in the cathode active material layer 21B through the electrolytic solution. Then, a stable coating based on 4-fluoroethylene carbonate is formed on the anode 22, and decomposition reaction of propylene carbonate in the anode 22 is inhibited. Further, since the content of 4-fluoroethylene carbonate is adjusted, increase in the interface resistance of the anode 22 is inhibited.

This secondary battery can be manufactured, for example, as follows.

First, for example, a cathode active material, a conductive agent, and a binder are mixed to prepare a cathode mixture. The cathode mixture is dispersed in a solvent such as N-methyl-2-pyrrolidone to obtain a paste cathode mixture slurry. Subsequently, the cathode current collector 21A is coated with the cathode mixture slurry, and the solvent is dried. After that, the resultant is compression-molded by a roll press machine to form the cathode active material layer 21B. Consequently, the cathode 21 is formed.

Next, for example, an anode active material and a binder are mixed to prepare an anode mixture. The anode mixture is dispersed in a solvent such as N-methyl-2-pyrrolidone to obtain a paste anode mixture slurry. Subsequently, the anode current collector 22A is coated with the anode mixture slurry, and the solvent is dried. After that, the resultant is compression-molded by a roll press machine or the like to form the anode active material layer 22B. Consequently, the anode 22 is formed.

Next, the cathode lead 25 is attached to the cathode current collector 21A by welding or the like, and the anode lead 26 is attached to the anode current collector 22A by welding or the like. After that, the cathode 21 and the anode 22 are wound with the separator 23 inbetween. An end of the cathode lead 25 is welded to the safety valve mechanism 15, and an end of the anode lead 26 is welded to the battery can 11. The wound cathode 21 and the wound anode 22 are sandwiched between the pair of insulating plates 12 and 13, and contained in the battery can 11. After the cathode 21 and the anode 22 are contained in the battery can 11, the electrolytic solution is injected inside the battery can 11, and impregnated in the separator 23. After that, at the open end of the battery can 11, the battery cover 14, the safety valve mechanism 15, and the PTC device 16 are fixed by being caulked through the gasket 17. The secondary battery shown in FIG. 1 is thereby completed.

As above, in this embodiment, the electrolytic solution contains 4-fluoroethylene carbonate at a ratio from 0.0027 g to 0.056 g per about 1 g of the carbon material contained in the anode 22. Therefore, decomposition reaction of propylene carbonate can be effectively inhibited while increase in the interface resistance of the anode 22 is held down. Consequently, the battery characteristics such as cycle characteristics can be improved.

In particular, when the area density of the anode is 18.0 mg/cm$^2$ or less, higher effects can be obtained.

EXAMPLES

Further, specific examples illustrative of the present invention without limitation will be described in detail.

Examples 1-1 to 1-9

Cylindrical secondary batteries as shown in FIG. 1 were fabricated.

First, lithium carbonate ($Li_2CO_3$) and cobalt carbonate ($CoCO_3$) were mixed at a ratio of $Li_2CO_3:CoCO_3=0.5:1$ (mole ratio). The mixture was fired for 5 hours at 900° C. in the air to obtain a sintered body. Regarding the obtained sintered body, X-ray diffraction measurement was performed. The result of the measurement well corresponded with the spectrum of $LiCoO_2$ registered in JCPDS file. Next, the sintered body was pulverized to obtain powders having a cumulative 50% particle diameter of 15 μm obtained by laser diffraction method. Subsequently, 95 parts by mass of the lithium cobalt complex oxide powders and 5 parts by mass of lithium carbonate powders were mixed. 94 parts by mass of the mixture, 3 parts by mass of Ketjen black as the conductive agent, and 3 parts by mass of polyvinylidene fluoride as the binder were mixed to prepare a cathode mixture. After that, the cathode mixture was dispersed in N-methyl-2-pyrrolidone as the solvent to obtain a cathode mixture slurry. Both faces of the cathode current collector 21A made of a strip-shaped aluminum foil were uniformly coated with the cathode mixture slurry, which was then dried. The resultant was compression-molded by a roll press machine to form the cathode active material layer 21B. Consequently, the cathode 21 was formed.

Further, as an anode active material, graphite powders having an average particle diameter of 25 μm were prepared. 90 parts by mass of the graphite powders and 10 parts by mass of polyvinylidene fluoride as the binder were mixed to prepare an anode mixture. Next, the anode mixture was dispersed in N-methyl-2-pyrrolidone, the solvent to obtain an anode mixture slurry. Both faces of the anode current collector 22A made of a strip-shaped copper foil were uniformly coated with the anode mixture slurry, which was then dried. The resultant was compression-molded by a roll press machine to form the anode active material layer 22B. Consequently, the anode 22 was formed. Then, the area density of the anode was 15.2 mg/cm². Further, the capacity ratio between the cathode 21 and the anode 22 on their opposed faces was cathode capacity:anode capacity equaling 97:100.

Subsequently, the cathode lead 25 was attached to the cathode 21, and the anode lead 26 was attached to the anode 22. After that, the cathode 21 and the anode 22 were layered with the separator 23 made of a micro porous polyethylene oriented film having a thickness of 25 μm inbetween and wound several times to form the winding electrode body 20. After that, the pair of insulating plates 12 and 13 was arranged above and below the winding electrode body 20. The resultant was contained in the battery can 11 made of nickel-plated iron. The cathode lead 25 was welded to the battery cover 14, and the anode lead 26 was welded to the battery can 11.

Next, an electrolytic solution was injected in the battery can 11 by reduced-pressure injection method. After that, the battery can 11 was calked through the gasket 17, and thereby the safety valve mechanism 15, the PTC device 16, and the battery cover 14 were fixed to obtain the secondary battery. As an electrolytic solution, the electrolytic solution obtained by dissolving 1.0 mol/l of $LiPF_6$ as an electrolyte salt into the mixed solvent of propylene carbonate (PC), ethylene carbonate (EC), and 4-fluoroethylene carbonate (FEC) was used.

Then, the respective volume ratios between propylene carbonate and ethylene carbonate in Examples 1-1 to 1-3, in Examples 1-4 to 1-6, and in Examples 1-7 to 1-9, were different from each other as shown in Tables 1 to 3. Specifically, the volume ratio between propylene carbonate and ethylene carbonate in Examples 1-1 to 1-3 was PC:EC=70:30. The volume ratio between propylene carbonate and ethylene carbonate in Examples 1-4 to 1-6 was PC:EC=50:50. The volume ratio between propylene carbonate and ethylene carbonate in Examples 1-7 to 1-9 was PC:EC=30:70. Further, the content of 4-fluoroethylene carbonate to 1 g of the carbon material (that is, graphite) of the anode 22 in Examples 1-1 to 1-9 were respectively changed as shown in Tables 1 to 3. Specifically, the content of 4-fluoroethylene carbonate per about 1 g of the carbon material of the anode 22 was 0.0027 g in Examples 1-1, 1-4, and 1-7; 0.028 g in Examples 1-2, 1-5, and 1-8; and 0.056 g in Examples 1-3, 1-6, and 1-9.

Further, as Comparative examples 1-1 to 1-9 to Examples 1-1 to 1-9, secondary batteries were fabricated as in Examples 1-1 to 1-9, except that the volume ratio between propylene carbonate and ethylene carbonate and the ratio of 4-fluoroethylene carbonate to 1 g of the carbon material of the anode were respectively changed as shown in Tables 1 to 3.

Regarding fabricated secondary batteries of Examples 1-1 to 1-9 and Comparative examples 1-1 to 1-9, charge and discharge test was performed to obtain discharge capacity retention ratios. The charge and discharge test was conducted in an environment of −10 deg C. Charge was performed until a battery voltage reached 4.2 V at a constant current of 1200 mA, and then performed until the total charge time reached 4 hours at a constant voltage of 4.2 V. Discharge was performed until a current voltage reached 2.75 V at a constant current of 1200 mA. The discharge capacity retention ratio was calculated as a ratio of the discharge capacity at the 100th cycle to the discharge capacity (initial discharge capacity) at the first cycle, that is, as (discharge capacity at the 100th cycle/initial discharge capacity)×100. Obtained results are shown in Tables 1 to 3.

TABLE 1

| | Ratio of FEC to 1 g of carbon material of anode (g) | PC:EC (volume ratio) | Area density of anode (mg/cm²) | Initial discharge capacity (mAh) | Discharge capacity retention ratio (%) |
|---|---|---|---|---|---|
| Example 1-1 | 0.0027 | 70:30 | 15.2 | 1012 | 38 |
| Example 1-2 | 0.028 | 70:30 | 15.2 | 1101 | 40 |
| Example 1-3 | 0.056 | 70:30 | 15.2 | 1126 | 37 |
| Comparative example 1-1 | 0 | 70:30 | 15.2 | 1009 | 36 |
| Comparative example 1-2 | 0.0026 | 70:30 | 15.2 | 1009 | 35 |
| Comparative example 1-3 | 0.057 | 70:30 | 15.2 | 1122 | 34 |

TABLE 2

| | Ratio of FEC to 1 g of carbon material of anode (g) | PC:EC (volume ratio) | Area density of anode (mg/cm²) | Initial discharge capacity (mAh) | Discharge capacity retention ratio (%) |
|---|---|---|---|---|---|
| Example 1-4 | 0.0027 | 50:50 | 15.2 | 1074 | 56 |
| Example 1-5 | 0.028 | 50:50 | 15.2 | 1139 | 81 |
| Example 1-6 | 0.056 | 50:50 | 15.2 | 1205 | 58 |
| Comparative example 1-4 | 0 | 50:50 | 15.2 | 1070 | 52 |
| Comparative example 1-5 | 0.0026 | 50:50 | 15.2 | 1071 | 52 |
| Comparative example 1-6 | 0.057 | 50:50 | 15.2 | 1207 | 51 |

TABLE 3

| | Ratio of FEC to 1 g of carbon material of anode (g) | PC:EC (volume ratio) | Area density of anode (mg/cm²) | Initial discharge capacity (mAh) | Discharge capacity retention ratio (%) |
|---|---|---|---|---|---|
| Example 1-7 | 0.0027 | 30:70 | 15.2 | 1099 | 66 |
| Example 1-8 | 0.028 | 30:70 | 15.2 | 1151 | 92 |
| Example 1-9 | 0.056 | 30:70 | 15.2 | 1217 | 66 |
| Comparative example 1-7 | 0 | 30:70 | 15.2 | 1094 | 63 |
| Comparative example 1-8 | 0.0026 | 30:70 | 15.2 | 1096 | 63 |
| Comparative example 1-9 | 0.057 | 30:70 | 15.2 | 1219 | 61 |

As shown in Tables 1 to 3, according to Examples 1-1 to 1-9, in which 4-fluoroethylene carbonate was used by mixing, the initial discharge capacity and the discharge capacity retention ratio could be improved, compared to Comparative examples 1-1, 1-4, and 1-7, in which 4-fluoroethylene carbonate was not contained, and Comparative examples 1-2, 1-5, and 1-8, in which the content of 4-fluoroethylene carbonate was small. Further, according to Examples 1-1 to 1-9, the discharge capacity retention ratio could be improved compared to Comparative examples 1-3, 1-6, and 1-9, in which the content of 4-fluoroethylene carbonate was large.

That is, it was found that when the content of 4-fluoroethylene carbonate was in the range from 0.0027 g to 0.056 g per about 1 g of the carbon material of the anode 22, the cycle characteristics could be improved.

Examples 2-1 to 2-12

Secondary batteries were fabricated as in Examples 1-4 to 1-6, except that the area density of the anode was changed as shown in Tables 4 to 7. Specifically, the area density of the anode was 16.6 mg/cm$^2$ in Examples 2-1 to 2-3, 17.3 mg/cm$^2$ in Examples 2-4 to 2-6, 17.5 mg/cm$^2$ in Examples 2-7 to 2-9, and 18.0 mg/cm$^2$ in Examples 2-10 to 2-12. As in Examples 1-4 to 1-6, the contents of 4-fluroethylene carbonate in Examples 2-1 to 2-3, Examples 2-4 to 2-6, Examples 2-7 to 2-9, and Examples 2-10 to 2-12 were changed in the range from 0.0027 g to 0.056 g per about 1 g of the carbon material of the anode 22 as shown in Tables 4 to 7.

Further, as Comparative examples 2-1 to 2-12 to Examples 2-1 to 2-12, secondary batteries were fabricated as in Examples 2-1 to 2-12, except that the ratio of 4-fluoroethylene carbonate to 1 g of the carbon material of the anode was changed as shown in Tables 4 to 7.

Regarding the fabricated secondary batteries of Examples 2-1 to 2-12 and Comparative examples 2-1 to 2-12, as in Examples 1-4 to 1-6, charge and discharge test was performed and the discharge capacity retention ratio at the 100th cycle was obtained. Results thereof are shown in Tables 4 to 7.

TABLE 4

| | Ratio of FEC to 1 g of carbon material of anode (g) | PC:EC (volume ratio) | Area density of anode (mg/cm$^2$) | Initial discharge capacity (mAh) | Discharge capacity retention ratio (%) |
|---|---|---|---|---|---|
| Example 2-1 | 0.0027 | 50:50 | 16.6 | 1085 | 55 |
| Example 2-2 | 0.028 | 50:50 | 16.6 | 1179 | 73 |
| Example 2-3 | 0.056 | 50:50 | 16.6 | 1214 | 52 |
| Comparative example 2-1 | 0 | 50:50 | 16.6 | 1081 | 50 |
| Comparative example 2-2 | 0.0026 | 50:50 | 16.6 | 1083 | 50 |
| Comparative example 2-3 | 0.057 | 50:50 | 16.6 | 1216 | 49 |

TABLE 5

| | Ratio of FEC to 1 g of carbon material of anode (g) | PC:EC (volume ratio) | Area density of anode (mg/cm$^2$) | Initial discharge capacity (mAh) | Discharge capacity retention ratio (%) |
|---|---|---|---|---|---|
| Example 2-4 | 0.0027 | 50:50 | 17.3 | 1092 | 53 |
| Example 2-5 | 0.028 | 50:50 | 17.3 | 1183 | 66 |
| Example 2-6 | 0.056 | 50:50 | 17.3 | 1221 | 49 |
| Comparative example 2-4 | 0 | 50:50 | 17.3 | 1087 | 48 |
| Comparative example 2-5 | 0.0026 | 50:50 | 17.3 | 1088 | 47 |
| Comparative example 2-6 | 0.057 | 50:50 | 17.3 | 1224 | 46 |

TABLE 6

| | Ratio of FEC to 1 g of carbon material of anode (g) | PC:EC (volume ratio) | Area density of anode (mg/cm$^2$) | Initial discharge capacity (mAh) | Discharge capacity retention ratio (%) |
|---|---|---|---|---|---|
| Example 2-7 | 0.0027 | 50:50 | 17.5 | 1099 | 51 |
| Example 2-8 | 0.028 | 50:50 | 17.5 | 1188 | 58 |
| Example 2-9 | 0.056 | 50:50 | 17.5 | 1229 | 48 |
| Comparative example 2-7 | 0 | 50:50 | 17.5 | 1095 | 47 |
| Comparative example 2-8 | 0.0026 | 50:50 | 17.5 | 1097 | 46 |
| Comparative example 2-9 | 0.057 | 50:50 | 17.5 | 1232 | 45 |

TABLE 7

| | Ratio of FEC to 1 g of carbon material of anode (g) | PC:EC (volume ratio) | Area density of anode (mg/cm$^2$) | Initial discharge capacity (mAh) | Discharge capacity retention ratio (%) |
|---|---|---|---|---|---|
| Example 2-10 | 0.0027 | 50:50 | 18.0 | 1112 | 46 |
| Example 2-11 | 0.028 | 50:50 | 18.0 | 1194 | 49 |
| Example 2-12 | 0.056 | 50:50 | 18.0 | 1234 | 42 |
| Comparative example 2-10 | 0 | 50:50 | 18.0 | 1109 | 41 |
| Comparative example 2-11 | 0.0026 | 50:50 | 18.0 | 1110 | 42 |
| Comparative example 2-12 | 0.057 | 50:50 | 18.0 | 1236 | 39 |

As shown in Tables 4 to 7, according to Examples 2-1 to 2-12, as in Examples 1-4 to 1-6, the discharge capacity retention ratio could be improved compared to Comparative examples 2-1 to 2-12. Further, when Tables 2 and 4 to 7 are compared to each other, there was a tendency that when the area density of the anode 22 was increased, the initial discharge capacity was increased, but the discharge capacity retention ratio was decreased. That is, it was found that the area density of the anode was preferably 18.0 mg/cm$^2$ or less.

The present invention has been described with reference to the embodiment and the examples. However, the present invention is not limited to the embodiment and the examples, and various modifications may be made. For example, in the foregoing embodiment and the foregoing examples, the case using the electrolytic solution as an electrolyte has been described. Further, in the foregoing embodiment, the case using the gelatinous electrolyte, in which the electrolytic solution is held in the high molecular weight compound has been described as well. However, other electrolyte may be made. As other electrolyte, for example, an electrolyte obtained by mixing an ion conductive inorganic compound such as an ion conductive ceramics, an ion conductive glass, and an ionic crystal with an electrolytic solution; an electrolyte obtained by mixing other inorganic compound with an electrolytic solution; or an electrolyte obtained by mixing the inorganic compounds with a gelatinous electrolyte can be cited.

Further, in the foregoing embodiment and the foregoing examples, descriptions have been given of the battery using lithium for electrode reaction. However, the present invention can be applied to the case using other alkali metal such as sodium (Na) and potassium (K); an alkali earth metal such as magnesium and calcium (Ca); or other light metal such as aluminum.

In addition, in the foregoing embodiment and the foregoing examples, descriptions have been specifically given with reference to the cylindrical secondary battery. However, the present invention can be also applied to a coin-shaped secondary battery, a button-shaped secondary battery, a rectangular secondary battery, a secondary battery having other shape using an exterior member such as a laminated film, or a secondary battery having other structure such as a laminated structure. Further, the present invention can be applied not only to the secondary battery, but also to other batteries such as a primary battery.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed is:

1. A battery comprising:
a cathode;
an anode; and
an electrolytic solution, wherein the anode contains a carbon material, the electrolytic solution obtained by dissolving $LiPF_6$ as an electrolyte salt into a mixed solvent of propylene carbonate, ethylene carbonate and 4-fluoroethylene carbonate, wherein 4-fluoroethylene carbonate is present in an amount from about 0.0027 g to about 0.056 g per about 1 g of the carbon material, wherein an area density of the anode is about 18.0 $mg/cm^2$ or less, and wherein a volume ratio of propylene carbonate to ethylene carbonate is between about 3:7 and about 7:3.

2. A battery according to claim 1, wherein the carbon material is selected from the group consisting of graphite, graphitizable carbon, non-graphitizable carbon and combinations thereof.

3. A battery according to claim 2, wherein the graphite has a true density of about 2.10 $g/cm^3$ or more, and a face distance of face (002) is less than about 0.340 nm.

4. A battery according to claim 1, wherein the cathode includes a lithium cobalt complex oxide.

5. A battery according to claim 1, wherein the cathode and the anode are wound with a separator therebetween.

* * * * *